United States Patent
Chevers et al.

(10) Patent No.: US 10,744,847 B2
(45) Date of Patent: Aug. 18, 2020

(54) VARIABLE REAR HVAC BLOWER MAPS FOR IMPROVED DEFROSTER PERFORMANCE

(71) Applicant: Toyota Motor Engineering & Manufacturing North America, Inc., Plano, TX (US)

(72) Inventors: Netsanet S. Chevers, Ann Arbor, MI (US); Hidekazu Hirabayashi, Ann Arbor, MI (US); Michael Camilleri, Pittsfield Township, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/046,907

(22) Filed: Jul. 26, 2018

(65) Prior Publication Data
US 2020/0031196 A1    Jan. 30, 2020

(51) Int. Cl.
*B60H 1/00* (2006.01)
*B60W 50/00* (2006.01)
*B60S 1/02* (2006.01)

(52) U.S. Cl.
CPC ..... *B60H 1/00828* (2013.01); *B60H 1/00785* (2013.01); *B60S 1/023* (2013.01);
(Continued)

(58) Field of Classification Search
CPC ............ B60H 1/00828; B60H 1/00785; B60H 2001/002; B60S 1/023; B60W 50/0098; B60W 2050/0026
See application file for complete search history.

(56) References Cited

U.S. PATENT DOCUMENTS 5,547,125 A    8/1996  Hennessee et al.
5,653,904 A    8/1997  Adlparvar et al.
(Continued)

FOREIGN PATENT DOCUMENTS

JP    2006151098        6/2006
JP    2019038392 A  *  3/2019

OTHER PUBLICATIONS

NPL English translation of Yuta (JP2019038392) (Year: 2019).*
(Continued)

*Primary Examiner* — Mahmoud S Ismail
*Assistant Examiner* — Bakari Underwood
(74) *Attorney, Agent, or Firm* — Snell & Wilmer LLP

(57) ABSTRACT

Methods, systems, and apparatus for a control system that improves defroster performance in a vehicle by reducing rear heater core heat rejection to increase heat availability to the defroster. The control system includes a rear heating, ventilation and air conditioning (HVAC) unit configured that moves air into the vehicle. The control system 100 includes a memory for storing multiple blower maps. The control system includes an electronic control unit connected to the rear HVAC unit and memory. The electronic control unit is configured to determine a mode for a front HVAC. The electronic control unit is configured to obtain from the memory a blower map for the rear HVAC unit from the multiple blower maps based on the mode. The electronic control unit is configured to determine an airflow rate for the air based on the obtained blower map and control an amount of air outputted.

18 Claims, 6 Drawing Sheets

(52) U.S. Cl.
CPC ... *B60W 50/0098* (2013.01); *B60H 2001/002* (2013.01); *B60W 2050/0026* (2013.01)

(56) References Cited

U.S. PATENT DOCUMENTS

| | | | |
|---|---|---|---|
| 5,699,857 | A | 12/1997 | Flaishans et al. |
| 5,988,517 | A | 11/1999 | Bauer et al. |
| 5,995,889 | A | 11/1999 | Eisenhour |
| 6,304,803 | B1 | 10/2001 | Dao |
| 6,454,178 | B1 | 9/2002 | Fusco et al. |
| 6,868,900 | B2 | 3/2005 | Dage et al. |
| 6,971,246 | B2 | 12/2005 | Kurata et al. |
| 7,156,167 | B2 | 1/2007 | Errington et al. |
| 8,151,581 | B2 | 4/2012 | Chen et al. |
| 8,346,422 | B2 | 1/2013 | Chen |
| 8,626,381 | B2 | 1/2014 | Tate, Jr. et al. |
| 8,745,997 | B2 | 6/2014 | Kumar et al. |
| 8,839,632 | B2 | 9/2014 | Goenka et al. |
| 8,849,487 | B2 | 9/2014 | Malone et al. |
| 9,168,810 | B2 | 10/2015 | Ghosh et al. |
| 9,272,602 | B2 | 3/2016 | Rollinger et al. |
| 9,662,959 | B2 | 5/2017 | Pebley et al. |
| 9,694,652 | B2 | 7/2017 | An et al. |
| 9,758,011 | B2 | 9/2017 | Johnston |
| 9,840,126 | B2 | 12/2017 | Kanemaru et al. |
| 2003/0127527 | A1* | 7/2003 | Ichishi ............... B60H 1/00735 236/49.3 |
| 2010/0236770 | A1 | 9/2010 | Pursifull |
| 2010/0304654 | A1 | 12/2010 | Kakizaki et al. |
| 2012/0214392 | A1* | 8/2012 | Kanemaru ......... B60H 1/00028 454/75 |
| 2012/0252341 | A1* | 10/2012 | Maehata ............ B60H 1/00028 454/75 |
| 2013/0196586 | A1 | 8/2013 | Hoke et al. |
| 2015/0224851 | A1 | 8/2015 | Baker |
| 2016/0018153 | A1 | 1/2016 | Ragazzi |
| 2016/0195348 | A1* | 7/2016 | Bidner ................ F16H 57/0417 701/2 |
| 2016/0377177 | A1* | 12/2016 | Gorski ................... F16J 15/022 296/208 |
| 2017/0267065 | A1 | 9/2017 | Kim et al. |
| 2017/0368909 | A1 | 12/2017 | Choi et al. |
| 2019/0128285 | A1* | 5/2019 | Soto Infante ......... F04D 29/582 |

OTHER PUBLICATIONS

NPL English Translation of Yuta (2019038392) (Year: 2019).*
https://www.howacarworks.com/basics/how-car-heating-and-ventilation-systems-work; 7 pages; 2018.
http://www.airconcars.com/html/how_it_works.html; 3 pages; 2018.

* cited by examiner

VARIABLE REAR HVAC BLOWER MAPS FOR IMPROVED DEFROSTER PERFORMANCE

BACKGROUND

Field

This specification relates to controlling one or more heating, ventilation, and air conditioning (HVAC) units within a vehicle.

Description of the Related Art

In a larger vehicle, such as a sport utility vehicle (SUV), van, minivan or other vehicle designed to have larger cabins, the vehicle may have two or more HVAC units, such as a front HVAC unit and a rear HVAC unit. Each HVAC unit may be independently controlled. The two or more HVAC units, typically, rely on separate heater cores that warm the air.

For example, when there are two HVAC units, a front HVAC unit directs air through a heater core to warm the front cabin and/or defog the window(s). The rear HVAC unit directs air through another heater core to warm the rear cabin. The HVAC units may use engine coolant that passes through different heater cores to warm air directed toward the window, front cabin and/or rear cabin. Thus, the use of the second HVAC unit reduces heater core heat rejection because the use of a heater core to warm the air directed to the rear cabin draws heat from the engine coolant that passes through both heater cores.

Accordingly, there is a need for a system and a method for improving defroster performance.

SUMMARY

In general, one aspect of the subject matter described in this specification may be embodied in a control system for a vehicle. The control system includes a rear heating, ventilation and air conditioning (HVAC) unit configured to move air into a rear cabin of the vehicle. The control system includes a memory for storing multiple blower maps that associate different airflow rates with different target airflow temperatures. The control system includes an electronic control unit connected to the rear HVAC unit and the memory. The electronic control unit is configured to determine a mode for a defroster including a defroster mode, a foot-defroster mode and all other HVAC modes. The electronic control unit is configured to obtain from the memory a blower map for the rear HVAC unit from the multiple blower maps based on the mode of the front HVAC. The electronic control unit is configured to determine an airflow rate for the air that is moved into the rear cabin based on the obtained blower map and control an amount of air outputted into the rear cabin based on the determined airflow rate.

These and other embodiments may optionally include one or more of the following features. The multiple blower maps may include a first blower map that corresponds to the defroster mode, a second blower map that corresponds to the foot-defroster mode and a third blower map that corresponds to any mode other than those associated with the defroster, such as an off or default mode where the defroster is not being used. The first blower map may be associated with a first range of airflow rates for a blower of the rear HVAC unit. The second blower map may be associated with a second range of airflow rates for the blower of the rear HVAC unit. The third blower map may be associated with a third range of airflow rates for the blower of the rear HVAC unit. The first range of airflow rates may be slower than the second range of airflow rates and the third range of airflow rates. The second range of airflow rates may be faster than the first range of airflow rates and slower than the third range of airflow rates. The third range of airflow rates may be faster than the first range of airflow rates and the second the second range of airflow rates.

The electronic control unit may be configured to select the first blower map that corresponds to the defroster mode as the blower map for the rear HVAC unit when the front HVAC mode is in the defroster mode. The electronic control unit may be configured to select the medium blower map that corresponds to the foot-defroster mode as the blower map for the rear HVAC unit when the front HVAC mode is in the foot-defroster mode. The electronic control unit may be configured to select the third blower map as the blower map for the rear HVAC unit when the mode is a front HVAC mode that does not use the defroster.

The electronic control unit may be configured to calculate a target airflow temperature. The electronic control unit may be configured to use the target airflow temperature to determine the airflow rate of the air that is moved into the rear cabin of the vehicle.

The control system 100 may include a sensor. The sensor may be configured to detect a temperature of the engine coolant. The control system may include a blower for the rear HVAC unit. The blower of the rear HVAC unit may be configured to move the air to be outputted into the rear cabin. The electronic control unit may be configured to delay activation of the blower of the rear HVAC unit until the temperature of the engine coolant is greater than or equal to a threshold temperature. The electronic control unit may be configured to determine that the temperature of the engine coolant is greater than or equal to the threshold temperature. The electronic control unit may be configured to activate the blower of the rear HVAC unit when the temperature of the engine coolant is greater than or equal to the threshold temperature.

The sensor may be configured to measure an amount of condensation on a window. The electronic control unit may be configured to delay activation of the blower of the rear HVAC unit when the amount of condensation is greater than or equal to a threshold amount. The electronic control unit may be configured to determine that the amount of condensation is less than the threshold amount. The electronic control unit may be configured to activate the blower of the rear HVAC unit when the amount of condensation is less than the threshold amount.

In another aspect, the subject matter may be embodied in a control system. The control system includes a rear heating, ventilation and air conditioning (HVAC) unit configured to move air into a rear cabin of the vehicle. The control system includes a memory for storing a plurality of blower maps that associate different airflow rates with different target airflow temperatures within the rear cabin of the vehicle. The control system includes a processor connected to the rear HVAC unit and the memory. The processor is configured to determine a target airflow temperature. The processor is configured to obtain, from the memory, a blower map for the rear HVAC unit from the plurality of blower maps. The processor is configured to determine an airflow rate for the air that is moved into the rear cabin of the vehicle based on the obtained blower map for the rear HVAC unit and the target airflow temperature. The processor is configured to control, using the rear HVAC unit, the air outputted into the rear cabin based on the determined airflow rate.

In another aspect, the subject matter may be embodied in a method for improving defroster performance by reducing rear HVAC heater core heat rejection, which increases outlet temperature of the front HVAC heater core. The method includes receiving, by a processor, a target airflow temperature based on the expected temperature. The method includes obtaining, by the processor, a blower map for a rear heating, ventilation and air conditioning (HVAC) unit from a plurality of blower maps. The method includes determining, by the processor, an airflow rate for air that is blown into a rear cabin of the vehicle based on the target airflow temperature and the obtained blower map. The method includes controlling, by the processor and using a blower, output of the air that is blown into the rear cabin based on the determined airflow rate.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for improving defroster performance. Particular embodiments of the subject matter described in this specification may be implemented to realize one or more of the following advantages. The control system accounts for the use of a rear heating, ventilation and air conditioning (HVAC) unit. The control system may adjust or control the speed of the blower of the rear HVAC unit to maximize the performance of the defroster. For example, the control system may reduce or minimize the speed of the blower of the rear HVAC unit to reduce the airflow rate into the rear cabin. This reduces the amount of energy used by the rear HVAC unit, which allows the control system to maximize or increase the temperature of the heated air directed towards one or more windows and improves defroster performance.

Additionally, if the control system reduces the speed of the blower of the rear HVAC unit, the temperature of the warmed air through the defroster increases. The reduction in the speed of the blower of the rear HVAC unit reduces rear heater core heat rejection, which increases the front heater core outlet air temperature because there is less airflow over the rear heater core. This allows the defroster to further draw on the front heater core to warm the air to defog the windows.

Other benefits and advantages include accounting for different defroster modes or settings, such as a defroster mode and/or a foot-defroster mode and having the capability to transition between different sets of blower maps based on other conditions, such as the amount of condensation or the temperature of the engine and/or the engine coolant. This further improves defroster performance, while maintaining comfort within the vehicle. The different modes adjust the direction of airflow through the defroster vent and/or the other front vents to control the amount of defogging of the window and the comfort within the cabin of the vehicle. Moreover, by transitioning between different sets of blower maps, the control system may automatically toggle to a higher rate of airflow to the rear cabin when the condensation on the windows has fallen below a threshold amount or the engine has warmed up sufficiently to provide sufficient warmth to warm the windows and the cabin of the vehicle.

Figure 1:
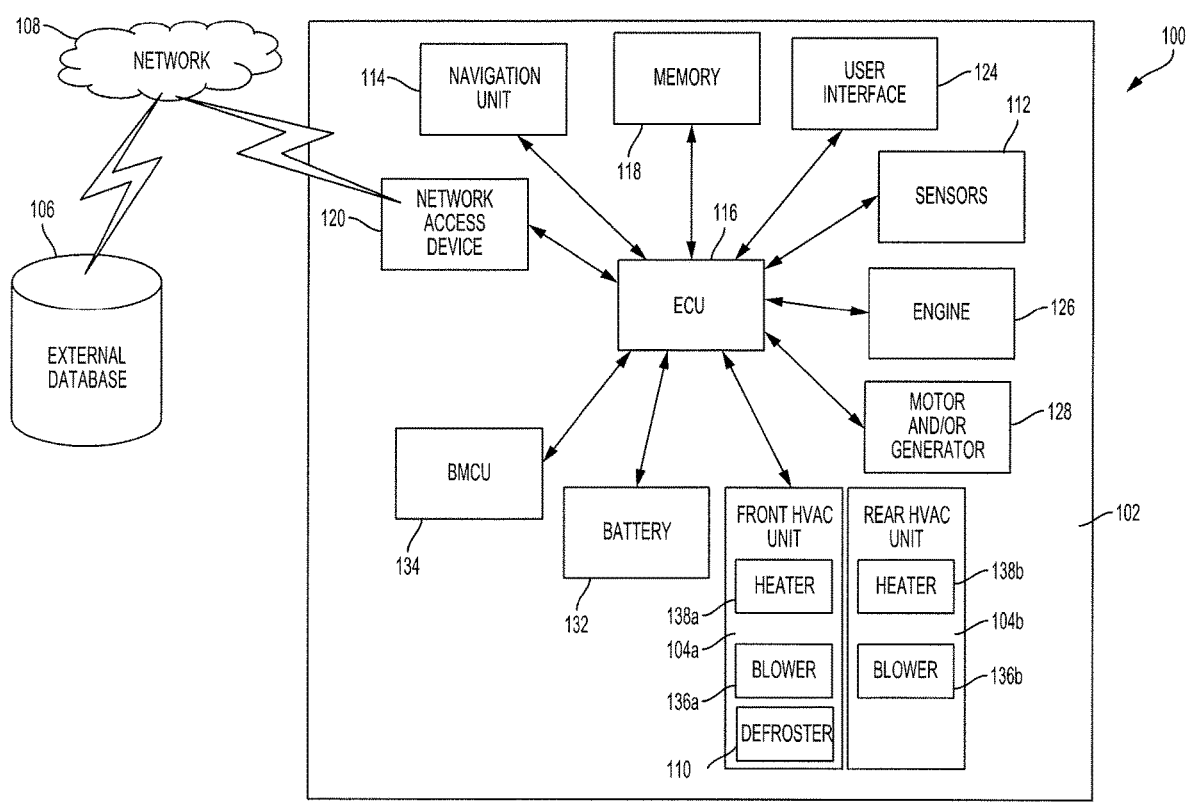
FIG. 1 is a block diagram of an example control system according to an aspect of the invention.
Figure 2:
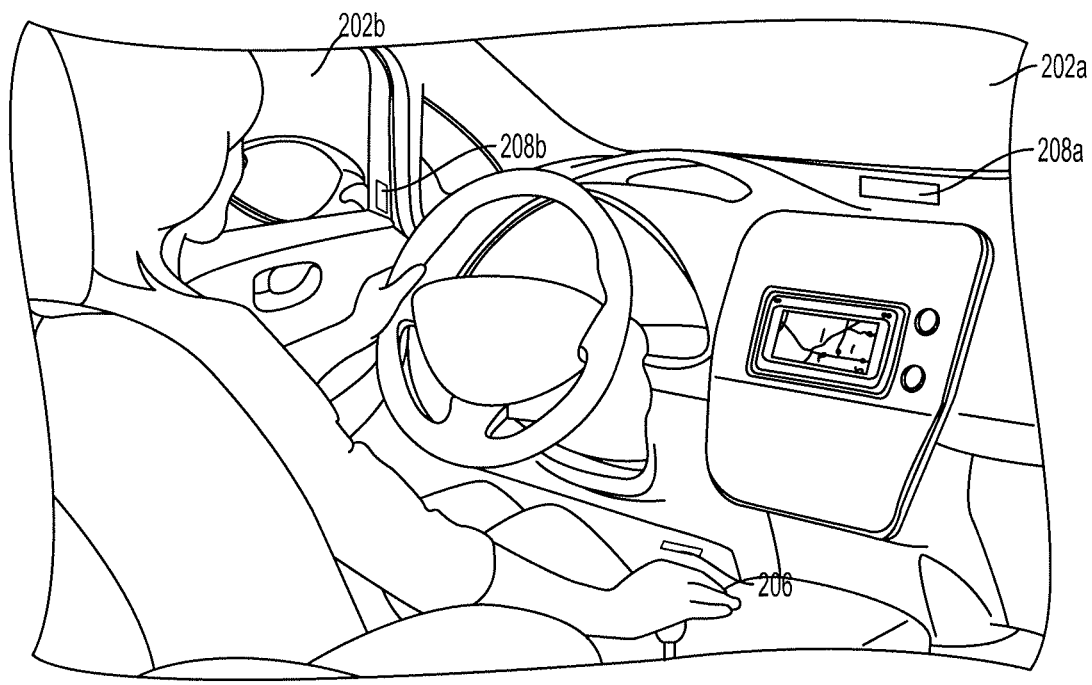
FIG. 2 shows the positioning of various vents within the cabin of the vehicle according to an aspect of the invention.

FIG. 1 is a block diagram of a control system 100. The control system 100 controls multiple heating, ventilation and air conditioning (HVAC) units 104a-b to provide comfort to occupants of the vehicle 102. The front HVAC unit 104a includes a defroster 110 to defog or defrost one or more windows of the vehicle 102. The control system 100 manages the airflow through the one or more heaters 138a-b of the multiple HVAC units 104a-b to improve the performance of the defroster 110 and provide comfort to the occupants. The control system 100 may control and/or operate a rear blower 136b, such as a fan, of the rear HVAC unit 104b. The control system 100 may adjust the speed of the rear blower 136b to control the airflow rate and reduce the amount of rear HVAC heater core heat rejection. This may increase the outlet air temperature of the front HVAC heater core of the front HVAC unit 104a, which improves defroster 110 performance in defogging the one or more windows 202a-b, as shown in FIG. 2, for example. Moreover, this reduces discomfort in the rear cabin when the defroster 110 is on by reducing the amount of hot air to the rear occupants. The outlet air of the front HVAC heater core of the front HVAC unit 104a may exit a defroster vent 208a-b to reduce the condensation on the one or more windows 202a-b when in the defroster mode. The front vent, in general, allows warm air to exit and warm or heat the front cabin of the vehicle. The front vent may be a foot vent 206 that may be positioned under the steering wheel and/or the dashboard. The foot vent may be directed toward the foot area of the cabin of the vehicle 102.

The control system 100 may include a vehicle 102 and one or more external databases 106. In some implementations, the control system 100 is a separate device from the vehicle 102 and/or the one or more external databases 106, and instead, connects to, is included in or is retrofitted to the vehicle 102 and/or the one or more external databases 106. For example, the control system 100 may connect to or be retrofitted to the vehicle 102 and wirelessly connect to the one or more external databases 106 through a network 108. The control system 100 includes any or all of the vehicle components of the vehicle 102 and/or interacts with the vehicle components of the vehicle 102.

A vehicle, e.g., vehicle 102, is a conveyance capable of transporting a person or persons or any material or any permanently or temporarily affixed apparatus. The vehicle may be a self-propelled wheeled conveyance, such as a car, truck, bus, van or other motor and/or battery driven vehicle. For example, the vehicle 102 may be an electric vehicle, a hybrid vehicle, or a plug-in hybrid vehicle. Other examples of vehicles include bicycles, trains, planes, or boats, and any other form of conveyance that is capable of transportation. The vehicle may be a semi-autonomous or an autonomous vehicle. That is, the vehicle 102 may be self-maneuvering and capable of sensing the environment and navigating without human input. An autonomous vehicle may use one or more sensors, e.g., the one or more sensors 112, and a navigation unit, e.g., the navigation unit 114, to drive autonomously.

The one or more external databases 106 may include databases from different service providers. A service provider may provide information to the vehicle 102, such as navigational map information, weather information, or other information. The information may be stored in the one or more external databases 106.

A database is any collection of pieces of information that is organized for search and retrieval, such as by a computer, and the database may be organized in tables, queries, schemas, queries, report, or any other data structures. A database may use any number of database management systems. An external database 106 may include a third-party server or website that stores or provides information. The information may be real-time information, updated periodically, or user-inputted. A server may be a computer in a network that is used to provide services, such as accessing files or sharing peripherals, to other computers in the network. A website may be a collection of one or more resources associated with a domain name.

Navigational map information may include locations of physical geographic features, such as hills, mountains, rivers and forests, and/or road features, such as highways, on-ramps, off-ramps, bridges, railroad crossings and toll roads. Weather information includes one or more weather features. The weather features include real-time and/or predicted temperatures for a particular location at a particular time of a day. The weather features may include the time for sunset, sunrise, and/or peak time. The weather features may include an amount of precipitation and/or humidity in the air at a particular location at a particular time. Other weather features may include an amount of cloud cover or wind.

Features, e.g., terrain features, road features, or weather features, each have a location that may be identified by map coordinates. The navigational map information and/or weather information may include the map coordinates associated with the features. Map coordinates include latitude and longitudinal coordinates.

The control system 100 may be a separate device from the vehicle 102, and/or the one or more external databases 106. The control system 100 and/or the vehicle 102 may connect to the one or more external databases 106 through a network 108. The network 108, such as a local area network (LAN), a wide area network (WAN), a cellular network, the Internet, or a combination thereof, may connect the vehicle 102 and/or the control system 100 to the one or more external databases 106.

The control system 100 includes a processor, such as an electronic control unit (ECU) 116, that is programmed to control the speed of the blower of the one or more HVAC units 104a-b. The control system 100 includes a front HVAC unit 104a and a rear HVAC unit 104b, a memory 118, one or more sensors 112, and/or a network access device 120. The front HVAC unit 104a may include a front heater 138a and a front blower 136a. The rear HVAC unit 104b may include a rear heater 138b and a rear blower 136b. The different blowers or fans may each blow air through the different heater cores to warm or heat the air that passes through. The front and rear HVAC units 104a-b may direct the warmed or heated air through the one or more front vents, such as a front face vent or a front foot vent, or a rear vent to warm the cabin of the vehicle 102 and/or a defroster vent to warm and defog the one or more windows.

The control system 100 may include a navigation unit 114 and/or a user interface 124. The control system 100 and/or the vehicle 102 may include an engine 126, a motor and/or generator 128, a battery 132 and/or a battery management control unit (BMCU) 134.

The motor and/or generator 128 may convert electrical energy into mechanical power, such as torque, and may convert mechanical power into electrical energy. The motor and/or generator 128 may be coupled to the battery 132. The motor and/or generator 128 may convert the energy from the battery 132 into mechanical power, and may provide energy back to the battery 132, for example, via regenerative braking. In some implementations, the vehicle 102 may include one or more additional power generation devices such as the engine 126 or a fuel cell stack (not shown). The engine 126 combusts fuel to provide power instead of and/or in addition to the power supplied by the motor and/or generator 128. The control system 100 may use the power and/or energy to power the one or more HVAC units 104a-b.

The battery 132 may be coupled to the motor and/or generator 128 and may provide electrical energy to and receive electrical energy from the motor and/or generator 128. The battery 132 may include one or more rechargeable batteries.

The BMCU 134 may be coupled to the battery 132, and may control and manage the charging and discharging of the battery 132. The BMCU 134, for example, may measure, using battery sensors, parameters used to determine the state of charge (SOC) of the battery 132. The BMCU 134 may control the battery 132 to maintain a reserve power for powering a blower of the heaters 138a-b.

The ECU 116 may be electrically coupled to some or all of the components of the vehicle 102. The ECU 116 may include one or more processors or controllers specifically designed for automotive systems, and the functions of the ECU 116 may be implemented in a single ECU or in multiple ECUs. The ECU 116 may receive data from one or more components and control the operation of one or more components based on the received or determined data. For example, the ECU 116 may receive data from a navigation unit 114, one or more sensors 112, and/or a network access device 120 and integrate the data received from each of the devices to output a display on a user interface 124. The ECU 116 may determine when to control the airflow rate of the blower of the one or more HVAC units 104a-b using the one or more sensors 112. The ECU 116 may control the operations of the BMCU 134 to charge or discharge the battery 132 to power the HVAC units 104a-b.

The memory 118 may be coupled to the ECU 116. The memory 118 may store instructions to execute on the ECU 116 and may include one or more of a random access memory (RAM) or other volatile or non-volatile memory. The memory 118 may be a non-transitory memory or a data storage device, such as a hard disk drive, a solid-state disk drive, a hybrid disk drive, or other appropriate data storage. The memory 118 may further store machine-readable instructions, which may be loaded and executed by the ECU 116 to control the speed of the fan or blower of the HVAC units 104a-b. The memory 118 may store multiple blower maps that correspond to different modes of the defroster 110, such as a defroster mode, a foot-defroster mode or other mode where the defroster 110 is not used, which may hereinafter be referred to as an off mode. In some implementations, the different modes may include a defroster and face vent mode that blows air through the defroster and face vent and/or a defroster, face vent and foot vent mode. The blower maps associate airflow rates with a temperature and/or a target airflow temperature.

The ECU 116 may be coupled to one or more sensors 112 that detect various internal or external environmental parameters. For example, a temperature sensor or a thermometer may measure an ambient temperature within the vehicle 102 or outside and surrounding the vehicle 102. In another example, an engine sensor may detect and/or measure a temperature of the engine 126. In another example, a humidity sensor or a hygrometer may detect an amount of humidity within the air either within the vehicle 102 or outside the vehicle 102.

The navigation unit 114 may include a Global Position System (GPS) unit (not shown) for detecting location data and date/time information. The navigation unit 114 may provide navigation instructions based on detected location data and may include a memory (not shown) for storing route data. The navigation unit 114 may obtain navigational map information from the one or more external databases 106, vehicle information, such as a current location or speed of the vehicle 102, and/or weather information, such as the temperature at a particular location.

The navigation unit 114 may be integral to the vehicle 102 or a separate unit coupled to the vehicle 102, or may be separate from the vehicle 102, such as a personal device with navigation capabilities. When the navigation unit 114 is separate from the vehicle 102, the navigation unit 114 may communicate with the vehicle 102 via the network access device 120. In some implementations, the vehicle 102 may include a GPS unit instead of the navigation unit 114. In that regard, the ECU 116 may perform the functions of the navigation unit 114 based on data received from the GPS unit. At least one of the navigation unit 114 or the ECU 116 may predict or propose a route set that includes a starting location and a destination location. The navigation unit 114 or the ECU 116 may perform navigation functions. Navigation functions may include, for example, route and route set prediction, providing navigation instructions, and receiving user input such as verification of predicted routes and route sets or destinations.

The navigation unit 114 may include a user interface separate from the user interface 124 and/or may communicate via the user interface 124. The user interface 124 may be a vehicle display or a personal device, e.g., a mobile phone, a tablet, a personal computer, which is connected to the ECU 116 through the network access device 120 across a network 108. The user interface 124 may include any device capable of receiving user input, such as a button, a dial, a microphone, or a touch screen, and any device capable of output, such as a display, a speaker, or a refreshable braille display. The user interface 124 allows a driver or a passenger of the vehicle 102 to communicate with the ECU 116. For example, the driver may be able to provide data to the ECU 116 and/or receive feedback from the ECU 116 via the user interface 124.

The network access device 120 may include a communication port or channel, such as one or more of a Wi-Fi unit, a Bluetooth® unit, a radio frequency identification (RFID) tag or reader, or a cellular network unit for accessing a cellular network (such as 3G or 4G). The network access device 120 may transmit data to and receive data from devices and systems not directly connected to the vehicle 102. For example, the ECU 116 may communicate with the external databases 106 via the network 108.

Figure 3:
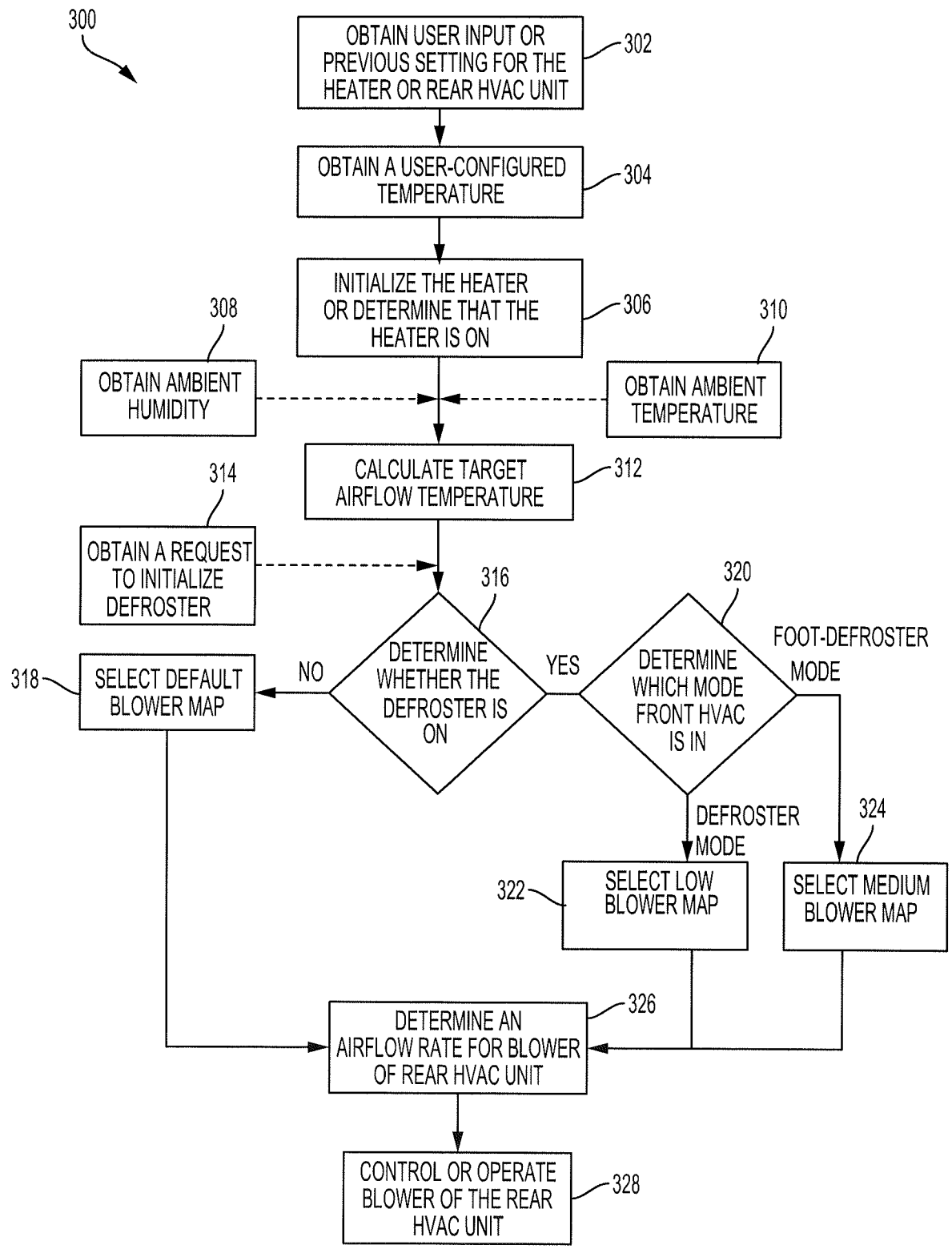
FIG. 3 is a flow diagram of an example process for controlling and/or adjusting an amount of air outputted from the rear HVAC unit into the cabin of the vehicle using the control system of FIG. 1 according to an aspect of the invention.

FIG. 3 describes the process 300 for controlling and/or adjusting the amount of outputted air from the rear HVAC unit 104b into the cabin of the vehicle 102. One or more computers or one or more data processing apparatuses, for example, the ECU 116 of the control system 100 of FIG. 1, appropriately programmed, may implement the process 300.

The control system 100 may obtain user input or a previous setting for the heater 138b of the rear HVAC unit 104b (302). The user input or the previous setting for the heater 138b may provide a current setting of the heater 138b, such as an on, off or automatic state. The control system 100 may receive the user input from a user interface element, such as a button or interface element on a display on the user interface 124. The user input may toggle the heater 138b among the different settings, e.g., the on, off or automatic state. The control system 100 may store the current setting of the heater 138b into the memory 118 for retrieval after the vehicle 102 has been turned off and subsequently restarted. The control system 100 may retrieve the previous setting from the memory 118 and use the previous setting as the current setting.

The control system 100 may obtain a user-configured temperature (304). The control system 100 may obtain the user-configured temperature via user input through the user interface 124 or detect an identity of an occupant using one or more sensors 112, such as a camera, and associate the identity to a user profile with the user-configured temperature to obtain the user-configured temperature. The control system 100 may capture the user-configured temperature either in degrees Fahrenheit or Celsius. The control system 100 may store the user profile that has the user-configured temperature for the occupant in the memory 118 and retrieve the user profile for the occupant from the memory 118. The control system 100 may retrieve the user profile when the vehicle 102 is activated, such as when an ignition sensor indicates that the ignition has been activated.

The control system 100 may initialize the heater 138b of the rear HVAC unit 104b or determine that the heater 138b is on based on the user input or the previous setting (306). For example, user input, such as the depression of a button or user interface element on the user interface 124, may set the current setting to an on state and turn on or initialize the rear heater 138b. The user input may set the current setting to an automatic state. In another example, the previous setting may be set to an on state that turns on or initializes the heater 138b or an automatic state. The control system 100 may obtain the previous setting from memory 118 and set the current setting to the previous setting. The control system 100 may initialize or turn on the heater 138b automatically when the temperature of the cabin of the vehicle 102 is less than the user-configured temperature and the current setting is set to the automatic state.

The control system 100 may obtain the ambient humidity of the air within the cabin of the vehicle 102 and/or the humidity of the air outside the vehicle 102 (308). The control system 100 may measure and/or detect an amount of humidity in the air and use the amount of humidity to determine a target airflow temperature and/or a target evaporator temperature for the air within the cabin of the vehicle 102. A sensor, such as a hygrometer, may measure and/or detect the humidity of the air.

The control system 100 may measure and/or detect an ambient temperature within the vehicle 102 and/or outside the vehicle 102 using one or more sensors 112, such as a temperature sensor or a thermometer (310). In some implementations, the control system 100 may access one or more external databases 106 and provide the one or more external databases 106 with a current location of the vehicle 102 to obtain the ambient temperature outside the vehicle 102. The control system 100 may query the one or more external databases 106 with the current location of the vehicle 102 and obtain weather information that includes the ambient temperature outside the vehicle 102 from the one or more external databases 106. The navigation unit 114 may obtain the current location of the vehicle 102 to provide to the one or more external databases 106. The control system 100 may use the network access device 120 to connect to the one or more external databases 106 via the network 108. In some implementations, the control system 100 may obtain navigational map information using the navigation unit 114 that includes the weather information, which the control system 100 extracts from the navigational map information.

The control system 100 may calculate a target airflow temperature (312). The control system 100 may use the user-configured temperature to calculate the target airflow temperature. The control system 100 may use the calculated target airflow temperature to control a blower, e.g., the rear blower 136b of the rear HVAC unit 104b, which blows air through or across a heater core to warm or heat the air within the cabin of the vehicle 102. By adjusting the user-configured temperature, an occupant controls the comfort level and the temperature of the air that exits the one or more HVAC units 104a-b into the cabin of the vehicle 102.

The control system 100 may calculate and/or determine the target airflow temperature based on the other obtained information including the ambient temperature, and/or the ambient humidity. The target airflow temperature may be a weighted average of the different factors. The control system 100 controls the speed of the blower of the HVAC units 104a-b to manage the airflow rate or volume of the air that passes through the heater 138a-b based on the target airflow temperature.

The control system 100 may obtain a request to initialize the defroster 110 (314). The request may be received via user input through the user interface 124 or may be automatic. The request may include a mode for the defroster 110. The different modes may include a defroster mode, a foot-defroster mode or other modes of the front HVAC unit 104a. In some implementations, the different modes may include a defroster and face vent mode that blows air through the defroster and face vent and/or a defroster, face vent and foot vent mode.

In the defroster mode, the control system 100 directs the air from the blower of the front HVAC unit 104a primarily through the defroster vents 208a-b. The defroster vent is positioned in proximity to one or more windows, such as the driver side window, the passenger side window and/or the front windshield, as shown in FIG. 2, for example. The defroster vents 208a-b direct the warm air at the one or more windows 202a-b to warm or heat the window to defog and/or defrost any condensation on the one or more windows 202a-b.

In the foot-defroster mode, the control system 100 directs the air from the blower of the front HVAC unit 104a primarily through the defroster vent 208a-b and the foot vent 206 in the front or rear cabin of the vehicle 102, which warms or heats the cabin of the vehicle 102.

In the defroster and face vent mode, the control system 100 directs the air from the blower through the defroster vent 208a-b and the front vent. In the defroster, face vent and foot vent mode, the control system 100 directs the air through all the front vents.

The user input may include a selection of a user interface element, such as a button, that may toggle the defroster 110 between different modes, such as a defroster mode, foot-defroster mode or other modes. The control system 100 may receive the request automatically. For example, the control system 100 may obtain a previously stored setting in the memory 118 that may be automatically loaded upon vehicle startup. In another example, one or more sensors 112 of the control system 100 may detect an amount of fog or condensation on the one or more windows and send a request to the ECU 116 to initialize the defroster 110. The ECU 116 may determine that the amount of fog or condensation is greater than or equal to a threshold amount and initialize or turn on the defroster 110.

Figure 4:
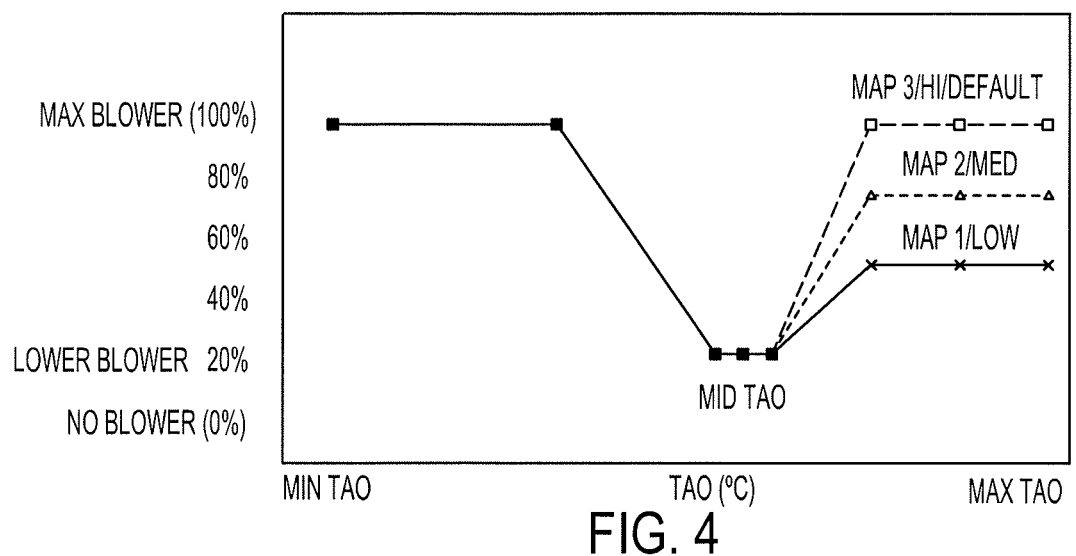
FIG. 4 shows an example graph showing the relationship of different blower maps used by the control system of FIG. 1 according to an aspect of the invention.

The control system 100 determines whether the front HVAC unit 104a has the defroster 110 on (316). If the HVAC is not in defrost mode or foot-defroster mode, the control system 100 selects a default blower map for the rear HVAC unit 104b when the rear HVAC unit 104 is initialized or activated (318). The default blower map may limit the airflow rate of the blower of the rear HVAC unit with a range that is limited by the maximum blower rate. The range may be between 0-100% of the maximum rate for the default blower map, as shown in FIG. 4, for example. The default blower map may have airflow rates that are greater than the other blower maps, such as the low blower map and the medium blower map, which correspond to the other modes for the defroster 110.

If the front HVAC unit 104a is set to the defroster mode or the foot-defroster mode, the control system 100 determines that the defroster 110 is on, and in response, the control system 100 determines which mode the front HVAC 104a is in (320). The control system 100 selects one or more other blower maps based on the mode of the front HVAC unit 104a. The control system 100 may determine that the front HVAC unit 104a is set to the defroster mode based on the mode and select a low blower map for the rear HVAC unit 104b that corresponds to when the front HVAC unit 104a is set to the defroster mode (322). The control system 100 may determine that the HVAC 104a is set to the foot-defroster mode based on the mode of the HVAC 104a and select a medium blower map for the rear HVAC unit 104b that corresponds to when the front HVAC unit 104a is set to the foot-defroster mode or other active mode, such as the defroster and face vent mode and/or the defroster, face vent and foot vent mode (324). If the heater 138b is not on and the rear HVAC unit 104b is on, the control system 100 selects a default blower map to control the speed of the blower of the rear HVAC unit 104b. If the rear HVAC unit 104 is not on, the control system 100 does not select a blower map since the blower is off.

The low blower map may limit the airflow rate to within a range, such as within a range that is limited to approximately 55% of the maximum rate, as shown in FIG. 4, for example. The low blower map may have airflow rates within a range that may be slower than the range of airflow rates for other blower maps associated with either the foot-defroster mode or other mode where there is no defroster. By spinning the rear blower 136b at a slower rate, less air that is directed to the rear cabin of the vehicle passes across the heater core of the rear HVAC unit 104b, and thereby, the temperature of the air that passes over the heater core of the front HVAC unit 104a increases because the amount of heater core heat rejection of the rear HVAC unit 104b is reduced. Since the temperature of the air that passes over the heater core of the front HVAC unit 104a increases, the performance of the defroster 110 improves since the air directed out of the defroster 110 is warmer.

The medium blower map may limit the airflow rate to within a range, such as within a range that is limited to approximately 75% of the maximum rate, as shown in FIG. 4, for example. The medium blower map may have airflow rates within a range that is faster than the range of airflow rates for the low blower map associated with the defroster mode but slower than the range of airflow rates for the default blower map.

Once the control system 100 selects a blower map, the control system 100 determines an airflow rate for the blower 136b of the rear HVAC unit 104b based on the selected blower map and the target airflow temperature (326). The control system 100 may map the calculated target airflow temperature to an airflow rate or volume using the selected blower map, as shown in FIG. 4, for example.

Figure 6:
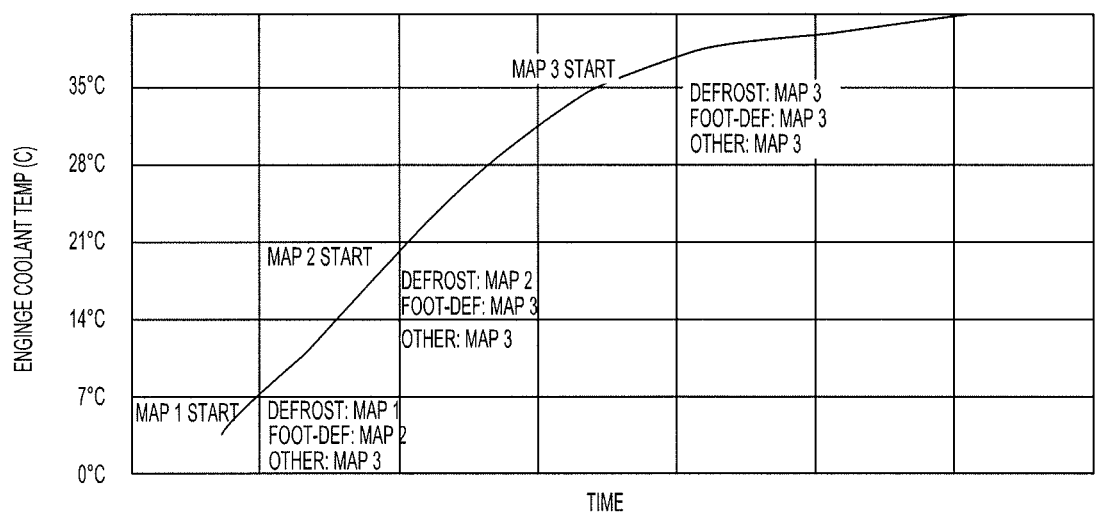
FIG. 6 shows an example graph shows the control system of FIG. 1 transitioning among different blower maps as the temperature of the engine coolant increases over time after a delay according to an aspect of the invention.

The control system 100 controls, operates and/or adjusts a speed of the blower of the rear HVAC unit 104b based on the determined airflow rate (328). The control system increases the speed of the blower to achieve a faster airflow rate and decreases the speed of the blower to achieve a slower airflow rate. In some implementations, the control system 100 may transition to a higher duty map with faster airflow rates based on the temperature of the engine coolant, engine temperature or other factor, as shown in FIG. 6, for example.

Figure 5:
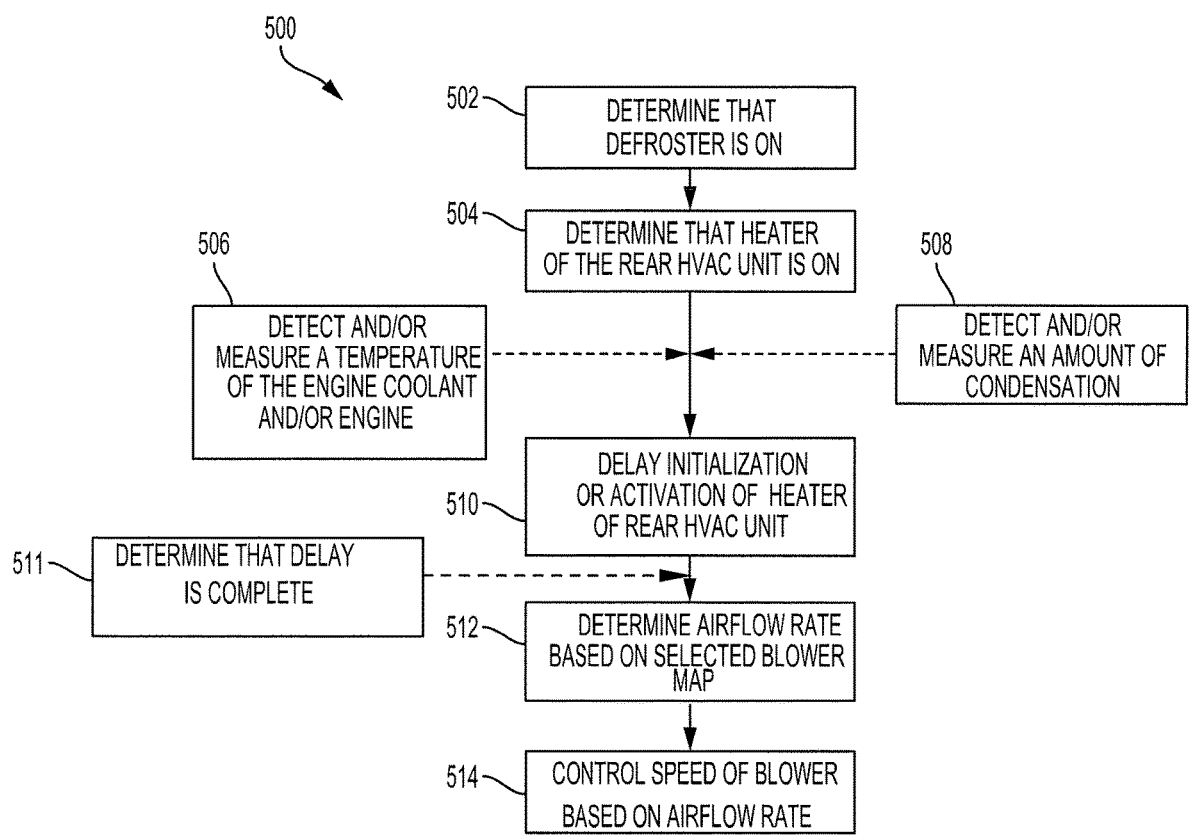
FIG. 5 is a flow diagram of an example process for delaying the control and/or adjustment of the airflow rate of the blower of the rear HVAC unit according to an aspect of the invention.

FIG. 5 describes the process 500 for delaying the control and/or adjustment of the airflow rate of the blower of the rear HVAC unit to improve performance of the defroster 110. One or more computers or one or more data processing apparatuses, for example, the ECU 116 of the control system 100 of FIG. 1, appropriately programmed, may implement the process 500.

The control system 100 determines that the defroster 110 is on (502). The control system 100 may determine that the defroster 110 is activated based on the mode of the front HVAC unit 104a. If the front HVAC unit 104a is set to the defroster mode or the foot-defroster mode, the control system 100 may determine that the defroster 110 is activated. As described above, the front HVAC unit 104a may be set to the defroster mode or the foot-defroster mode based on user input and/or a previous setting.

The control system 100 may determine that the heater 138b is on based on the current setting (504). The current setting may be obtained via user input and/or a previous setting, as described above. For example, the control system 100 may obtain a user selection of a user interface element or button via the user interface 124 that indicates that the heater 138b is to be turned on. In another example, the control system 100 may obtain the previous setting from the memory 118 that indicates that the heater 138b was previously turned on during the previous ride or trip.

The control system 100 may detect and/or measure a temperature of the coolant within the engine and/or the engine (506). The control system 100 may detect and/or measure the temperature of the coolant within the engine 126 to trigger the activation of the heater 138b using the selected blower map. In some implementations, the control system 100 detects and/or measures a temperature of the engine 126. The control system 100 may use one or more sensors 112, such as an engine sensor, that measure a temperature of the engine 126. The control system 100 may use the temperature of the engine 126 to trigger the activation of the heater 138b using the selected blower map when the temperature is greater than or equal to a threshold temperature value.

The control system 100 may detect and/or measure an amount of condensation on the one or more windows using one or more sensors 112 (508). The control system 100 may use one or more sensors 112, to measure the amount of condensation on the one or more windows. The control system 100 may use the measurement to trigger the activation of the heater 138b using the selected blower map when the amount of condensation is less than or equal to a threshold amount.

When the defroster 110 is activated, the control system 100 may delay initialization or activation of the blower 136b of the rear HVAC unit 104b (510). The control system 100 may delay the initialization or the activation of the blower 136b based on the mode of the front HVAC unit 104a. The amount of the delay may be different for the different modes. When the defroster 110 is set to the defroster mode, the control system 100 directs the warmed air solely to defogging the condensation from the one or more windows. When the front HVAC unit 104a is set to the foot-defroster mode, the control system 100 directs the warmed air to both defogging the window and warming the front cabin. The delay may be longer for the defroster mode in comparison to the foot-defroster mode. For example, if the front HVAC unit 104a is in the defroster mode, the control system 100 may delay the activation or the initialization of the heater 138b for a period, such as until 10 minutes after the defroster 110 has been activated. In another example, if the front HVAC unit 104a is in the foot-defroster mode, the control system 100 may delay the activation or the initialization of the heater for a different period, such as until 7 minutes after the defroster 110 has been activated. The period for the delay may be user-configured or pre-determined and/or may be obtained from the memory and based on a user profile of one or more occupants of the vehicle 102 that one or more sensors 112, such as a camera, may identify.

In some implementations, the control system 100 may delay the initialization or the activation of the heater 138b based on the measurement of the temperature of the engine coolant. If the control system 100 determines that the engine coolant is below a low threshold temperature, such as 5° C., the control system 100 may implement a longer delay, such as several minutes after the defroster 110 is initialized, in activating or initializing the heater 138b. If the control system 100 determines that the engine coolant is within a middle temperature range, such as between 5° C. and 35° C., the control system 100 may implement a medium delay that is less than the longer delay, such as a few minutes (e.g., 2-3 minutes) after the defroster 110 is initialized, in activating or initializing the heater 138b. If the control system 100 determines that the engine coolant is fully warmed above a high threshold temperature, such as 35° C., the control system 100 may implement a minimal or no delay, which is less than the medium delay and the longer delay, such as approximately a minute after the defroster is initialized, in activating or initializing the heater 138b.

The control system 100 may delay the initialization or the activation of the heater 138b based on the measurement of the amount of condensation on the one or more windows and/or the measurement of the temperature of the engine 126. For example, the amount of delay may be increased as the amount of condensation on the one or more windows increases.

The control system 100 may delay the initialization or the activation of the heater 138b based on the temperature of the engine. For example, the amount of delay decreases as a current temperature of the engine increases so as the engine warms the delay becomes less. The control system 100 may delay the initialization or the activation of the heater 138b until the temperature of the engine 126 is greater than or equal to one or more threshold temperature values and/or the amount of condensation is less than or equal to one or more threshold amounts.

The control system 100 may use a combination of the temperature of the engine coolant, the temperature of the engine, the amount of condensation on the one or more windows and/or the one or more modes that the defroster 110 is set in to determine the amount of delay after the defroster 110 is initialize to activate or initialize the heater 138b.

The control system 100 may determine that the delay is complete (511). The control system 100 may determine that the delay is complete when the period for the delay has elapsed, when the temperature of the engine or engine coolant has reached a threshold temperature and/or when the amount of condensation on the one or more windows is less than a threshold amount.

The control system 100 may activate, control, operate or otherwise adjust the speed of the blower of the rear HVAC unit 104b based on the selected blower map after and/or in response to the completion of the delay. After the delay is complete, such as when the period of the delay has expired, the control system 100 may determine the airflow rate for the speed of the rear blower 136b of the rear HVAC unit 104b. The control system 100 maps the target airflow temperature to an airflow rate using the selected blower map (512). The control system 100 may turn on or otherwise adjust or control the speed of the rear blower 136b to correspond with the determined airflow rate (514). The control system 100 may use a combination of the delay and/or the different blower maps with the different airflow rates to control when the rear blower 136b is activated and the speed of the rear blower 136b. For example, the longer delay may be several minutes for the defroster mode but only a few minutes for the foot-defroster mode.

Moreover, the control system 100 may transition the rear blower 136b to another blower map with faster airflow rates for each of the different modes based on the engine coolant temperature, engine temperature or other factors that may be measured by the one or more sensors (516). For example, as shown in FIG. 6, the control system 100 may select the blower map to be used from the first set of blower maps when the engine coolant temperature is less than 5° C. The control system 100 transitions from selecting from the first set of blower maps to the second set of blower maps based on the mode to control the speed of the rear blower 136b when the engine coolant temperature reaches approximately 5° C. The control system 100 may transition to selecting a blower map from a third set of blower maps when the engine coolant temperature reaches approximately 35° C. A blower map from the second set of blower maps may be used when the engine coolant temperature is between 5° C. and 35° C., and a blower map from the third set of blower maps may be used when the engine coolant temperature is above 35° C.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A control system for a vehicle, comprising:
   a rear heating, ventilation and air conditioning (HVAC) unit having a rear blower that is configured to move air into a rear cabin of the vehicle;
   a front HVAC unit having a plurality of modes including a defroster mode and a foot-defroster mode and that is configured to move air into a front cabin of the vehicle;
   a memory for storing a plurality of blower maps that map different target airflow temperatures to different airflow rates; and
   an electronic control unit connected to the rear HVAC unit and the memory, the electronic control unit being configured to:
      select a mode from the plurality of modes for the front HVAC unit based on user input,
      obtain, from the memory, a blower map for the rear blower from the plurality of blower maps based on the mode, and
      set a speed of the rear blower that reduces an amount of heater core heat rejection of the rear HVAC unit and increases an outlet air temperature of the front HVAC unit based on the obtained blower map for the rear blower.

2. The control system of claim 1, wherein the plurality of blower maps include a first blower map that corresponds to the defroster mode, a second blower map that corresponds to the foot-defroster mode and a third blower map that corresponds to other modes.

3. The control system of claim 2, wherein the first blower map is associated with a first range of airflow rates for the rear blower of the rear HVAC unit, wherein the second blower map is associated with a second range of airflow rates for the rear blower of the rear HVAC unit, wherein the third blower map is associated with a third range of airflow rates for the rear blower of the rear HVAC unit.

4. The control system of claim 3, wherein the first range of airflow rates is slower than the second range of airflow rates and the third range of airflow rates, wherein the second range of airflow rates is faster than the first range of airflow rates and slower than the third range of airflow rates, wherein the third range of airflow rates is faster than the first range of airflow rates and the second range of airflow rates.

5. The control system of claim 2, wherein to obtain the blower map for the rear blower from the plurality of blower maps based on the mode, the electronic control unit is configured to:
   select the first blower map that corresponds to the defroster mode as the blower map when the mode is the defroster mode;
   select the second blower map that corresponds to the foot-defroster mode as the blower map when the mode is the foot-defroster mode; and
   select the third blower map as the blower map when the mode is any other mode.

6. The control system of claim 1, wherein the electronic control unit is configured to calculate a target airflow temperature and set the speed of the rear blower further based on the target airflow temperature.

7. The control system of claim 1, further comprising:
   a sensor configured to detect a temperature of engine coolant;
   wherein the electronic control unit is configured to:

delay activation of the rear blower until the temperature of the engine coolant is greater than or equal to a threshold temperature, determine that the temperature of the engine coolant is greater than or equal to the threshold temperature, and activate the rear blower when the temperature of the engine coolant is greater than or equal to the threshold temperature.

8. The control system of claim 1, further comprising:

a sensor configured to measure an amount of condensation on a window;

wherein the electronic control unit is configured to:

delay activation of the rear blower when the amount of condensation is greater than or equal to a threshold amount, determine that the amount of condensation is less than the threshold amount, and activate the rear blower to move the air into the rear cabin when the amount of condensation is less than the threshold amount.

9. A control system for a vehicle, comprising:

a rear heating, ventilation and air conditioning (HVAC) unit configured to move air into a rear cabin of the vehicle;

a front heating, ventilation and air conditioning (HVAC) unit having a plurality of defroster settings and configured to move air into a front cabin of the vehicle;

a memory for storing a plurality of blower maps that map different target airflow temperatures to different air flow rates within the rear cabin of the vehicle; and a processor connected to the rear HVAC unit and the memory, the processor being configured to:

determine a target airflow temperature, select a defroster setting from the plurality of defroster settings for the front HVAC unit, obtain, from the memory, a blower map for the rear HVAC unit from the plurality of blower maps based on the defroster setting, and set a speed of a rear blower of the rear HVAC unit that reduces an amount of air that flows across a rear heater core to reduce an amount of heater core heat rejection of the rear HVAC unit and increases an outlet air temperature of air that flows across a front heater core of the front HVAC unit based on the obtained blower map for the rear HVAC unit and the target airflow temperature.

10. The control system of claim 9, wherein the defroster setting includes a defroster mode, a foot-defroster mode, and an off mode, wherein the plurality of blower maps include a first blower map that corresponds to the defroster mode, a second blower map that corresponds to the foot-defroster mode and a third blower map that corresponds to the off mode.

11. The control system of claim 10, wherein to obtain the blower map for the rear HVAC unit from the plurality of blower maps based on the defroster setting, the electronic control unit is configured to:

select the first blower map that corresponds to the defroster mode as the blower map when the defroster setting is set to the defroster mode;

select the second blower map that corresponds to the foot-defroster mode as the blower map when the defroster setting is set to the foot-defroster mode; and select the third blower map as the blower map when the defroster setting is set to the off mode.

12. The control system of claim 10, wherein the first blower map has a first set of airflow rates that are associated with a plurality of target airflow temperatures, the second blower map has a second set of airflow rates that are associated with the plurality of target airflow temperatures, and the third blower map has a third set of airflow rates that are associated with the plurality of target airflow temperatures, wherein the first set of airflow rates are less than the second set of airflow rates and the second set of airflow rates are less than the third set of airflow rates.

13. The control system of claim 9, wherein the front HVAC unit is configured to move the air through at least one of a defroster onto a window or a front vent of the vehicle, wherein the rear HVAC unit is further configured to move the air through a rear vent into the rear cabin.

14. The control system of claim 13, further comprising:

one or more sensors configured to detect a temperature of engine coolant;

wherein to obtain the blower map includes selecting the blower map based on the temperature of the engine coolant.

15. The control system of claim 9, further comprising:

one or more sensors configured to detect a temperature of an engine;

wherein the electronic control unit is configured to:

delay activation of the rear HVAC unit based on the temperature of the engine;

determine that the temperature of the engine is greater than or equal to a threshold temperature; and activate the rear HVAC unit to move the air into the rear cabin of the vehicle.

16. A method for improving defroster performance in a vehicle, comprising:

receiving, by a processor, user input that indicates an expected temperature;

determining, by the processor, a target airflow temperature based on the expected temperature;

obtaining, by the processor, a user setting of a front heating, ventilation and air conditioning (HVAC) unit;

obtaining, by the processor, a blower map for a rear HVAC unit from a plurality of blower maps based on the user setting of the front HVAC unit; and setting, by the processor, a speed of a rear blower of the rear HVAC unit that reduces an amount of heater core heat rejection of the rear HVAC unit and increases an outlet air temperature of the front HVAC unit based on the target airflow temperature and the obtained blower map.

17. The method of claim 16, wherein the user setting of the front HVAC unit includes a defroster mode, a foot-defroster mode, and other modes, wherein the plurality of blower maps include a first blower map that corresponds to the defroster mode, a second blower map that corresponds to the foot-defroster mode and a third blower map that corresponds to the other modes.

18. The method of claim 16, wherein obtaining the blower map for the rear HVAC unit from the plurality of blower maps based on the user setting includes:

selecting, by the processor, the first blower map that corresponds to the defroster mode as the blower map when the user setting is set to the defroster mode;

selecting, by the processor, the second blower map that corresponds to the foot-defroster mode as the blower map when the user setting is set to the foot-defroster mode; and selecting, by the processor, the third blower map as the blower map when the user setting is set to the other modes.

\* \* \* \* \*